(No Model.)
W. SCANTLEBURY.
BICYCLE.
No. 446,175. Patented Feb. 10, 1891.
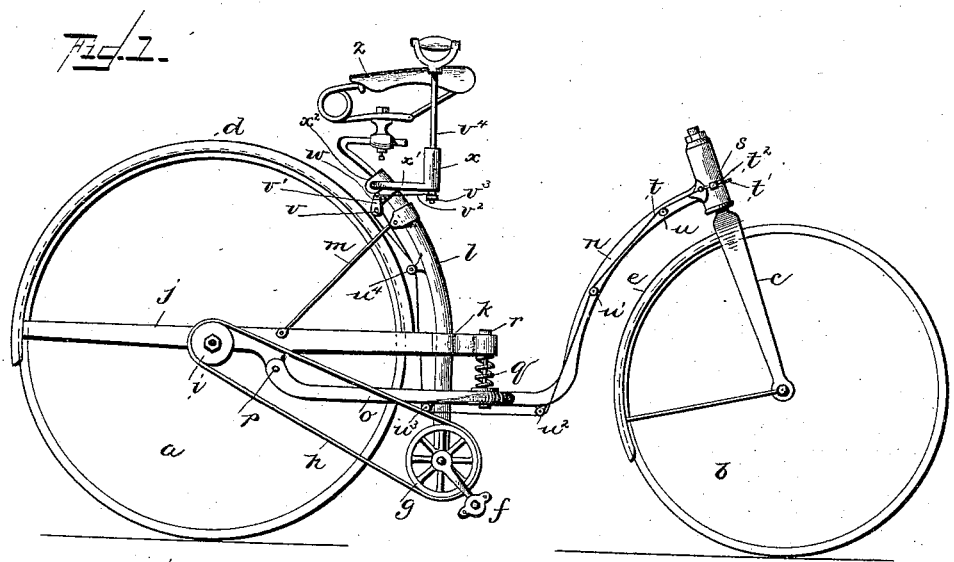
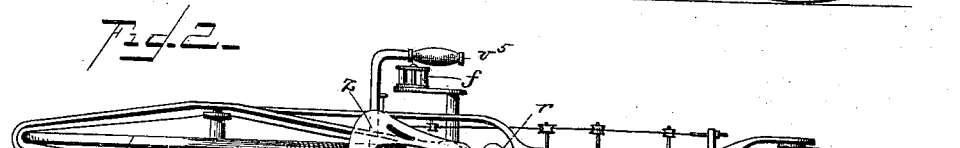
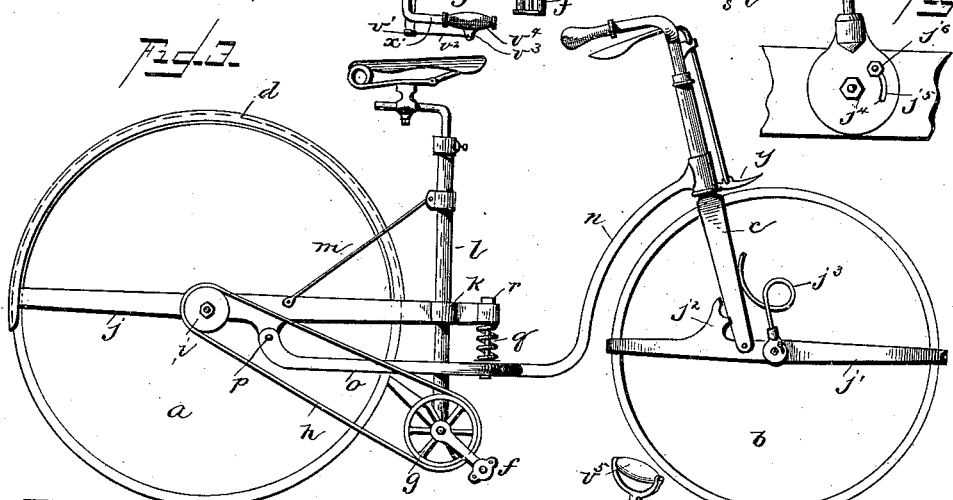
WITNESSES:
F. L. Durand
E. A. Finckel
INVENTOR
William Scantlebury
BY
Wm. N. Finckel
his ATTORNEY.

UNITED STATES PATENT OFFICE.

WILLIAM SCANTLEBURY, OF ROCKAWAY, NEW JERSEY.

BICYCLE.

SPECIFICATION forming part of Letters Patent No. 446,175, dated February 10, 1891.

Application filed May 28, 1890. Serial No. 353,429. (No model.)

*To all whom it may concern:*

Be it known that I, WILLIAM SCANTLEBURY, a citizen of the United States, residing at Rockaway, in the county of Morris and State of New Jersey, have invented a certain new and useful Improvement in Bicycles, of which the following is a full, clear, and exact description.

This invention relates to bicycles, and has for its object to provide an elastic frame whereby the ill effects of shocks, jars, and concussions will be mitigated with relation to the rider and to the machine.

A further object of the invention is to provide for the steering of the machine from handles arranged alongside of the saddle or seat.

The invention will be first described, and then particularly pointed out in the claims.

In the accompanying drawings, illustrating my invention, in the several figures of which like parts are similarly designated, Figure 1 is a side elevation, showing only enough of a bicycle to represent my invention. Fig. 2 is plan view of the bicycle shown in Fig. 1. Fig. 3 is a side elevation of another form of the machine comprising my invention. Fig. 4 is a perspective view of the steering apparatus shown in Figs. 1 and 2, and Fig. 5 is a detail to be referred to.

In the machine shown in Fig. 1 the wheels $a$ $b$, front fork $c$, mud-guards $d$ and $e$, pedals and cranks $f$, and gearing $g$ $h$ $i$ may be of any approved construction.

$j$ is a frame supported upon the axle of the wheel $a$ and encircling the said wheel and having a socket $k$ to receive the seat-post $l$. Braces $m$ extend from the seat-post to the frame $j$ to stay these parts. The backbone $n$ extends from the fork $c$ rearwardly, and is forked at $o$, so as to straddle the post $l$ and rear wheel, and is pivoted or jointed or hinged at $p$ to the frame $j$, so as to have a free up-and-down motion with relation to the said frame. This motion is limited and controlled by means of a spring $q$, interposed between the said backbone and the forward end of the frame, a bolt or other suitable connector $r$ being passed through the backbone, spring, and forward end of the frame $j$ to prevent the frame and backbone from parting from one another. Very obviously the spring $q$ takes up shock, jar, and concussions from both machine and rider and so renders the machine very much easier to the rider.

The front fork $c$ is provided with laterally-projecting arms $s$, to which steering-chains $t$ are secured by bolts $t'$ and nuts $t^2$, and by means of these bolts $t'$ and nuts $t^2$ any slack of the chains may be taken up. These chains extend from the arms $s$ on each side of the machine over pulleys $u$ $u'$ $u^2$ on the backbone and pulleys $u^3$ and $u^4$ on the post $l$, up to a rock-shaft $v$, which is secured to the post $l$ by a bracket or arm $w$. The chains are wound in opposite directions upon this rock-shaft as upon a drum, so that as the rock-shaft is rotated in one direction one chain will be unwound and the other wound up, and thus the rotation of the fork, and consequently the steering, will be effected. In order to rotate the rock-shaft $v$, one end of said shaft is provided with a crank-arm $v'$, and this crank-arm is connected by a rod $v^2$ with a crank-arm $v^3$ on the end of the handle-bar $v^4$. The said handle-bar is supported in a bearing $x$, which is in turn supported upon an arm $x'$, made fast to the post $l$ by means of the bracket $x^2$. The arm $x'$ extends laterally on both sides of the post $l$, and terminates at each end in sockets to receive the handle-bars $v^4$ and $v^5$. (See Figs. 2 and 4.) As already described, the handle-bar $v^4$ actuates the steering mechanism. The handle-bar $v^5$ may be connected in any suitable or usual manner with the brake mechanism. (Not shown.)

When the steering apparatus is arranged upon the front-wheel fork, as shown in Fig. 3, I prefer to employ a frame $j'$, encircling the front wheel, and to pivot the fork $c$ to this frame instead of to the axle of the front wheel, and to project from this frame $j'$ rests $j^2$ in the rear of the fork for bracing or staying the said fork as occasion may require. Springs $j^3$ are secured to the frame and bear against the front fork in order normally to hold it against the rests $j^2$. The employment of the springs $j^3$ and rests $j^2$ gives solidity to the parts when the brake $y$ (here shown as of ordinary construction) is applied.

In order to regulate the tension of the springs $j^3$, I may affix the said springs to disks $j^4$, and pivot these disks to the frame $j'$ and provide slots $j^5$ in the disks which co-operate with bolts or set-screws, or the like, $j^6$ for adjusting the angle of inclination of the said springs relatively to the fork.

Instead of a curved post, as shown in Fig. 1, I may employ a straight post $l$, as shown in Fig. 3.

As shown in Fig. 3, I have employed in this form of bicycle the divided elastic frame shown in Fig. 1; but I do not wish to be understood as limiting the invention in the steering apparatus to its employment solely in connection with the divided frame. Again, I do not limit the application of the front steering-post to its connection with the frame $j'$ eccentrically with relation to the wheel.

The seat $z$ in each form shown may be of usual or approved construction.

What I claim is—

1. In a bicycle or other like vehicle, a divided frame one portion of which is supported upon the axle of the rear wheel and supports the saddle or seat and the other portion is connected with the front wheel and is forked and extends beneath and is pivoted to the first-named portion, and a spring interposed between the two, substantially as and for the purpose described.

2. In a bicycle or other like vehicle, the combination of a frame supported upon the axle of one wheel, a seat-post secured in said frame, oblique braces interposed between the frame and post, a backbone forked and extended beneath and pivoted to the said frame and connected with the front wheel, a spring interposed between the frame and backbone, and a connector, substantially as and for the purpose described.

3. In a bicycle or other vehicle, a frame on the steering-wheel, combined with a steering-post pivoted to the said frame, rests for the said steering-post on said frame, and springs impelling the said post toward the said rests, substantially as and for the purpose described.

4. The combination, with the seat-post, of an arm $x'$, extending laterally from each side of the post, supporting-handles for operating the steering mechanism and the brake, and a bracket connecting the said arm and post, substantially as described.

5. In a bicycle or like vehicle having a steering-handle arranged at the seat, the combination of the steering-wheel, a rock-shaft on the seat-post, chains connecting the steering-wheel and rock-shaft, and a crank connection between the rock-shaft and the handle, substantially as and for the purpose described.

In testimony whereof I have hereunto set my hand this 23d day of May, A. D. 1890.

WILLIAM SCANTLEBURY.

Witnesses:
L. UNDERHILL, Jr.,
S. C. HART.